United States Patent Office 3,813,448
Patented May 28, 1974

3,813,448
NUCLEAR CHLORINATION OF ALKYL SUBSTI-
TUTED AROMATIC COMPOUNDS
Stephen N. Massie, Palatine, Ill., assignor to Universal
Oil Products Company, Des Plaines, Ill.
No Drawing. Filed Mar. 20, 1972, Ser. No. 236,335
Int. Cl. C07c 25/04, 25/22
U.S. Cl. 260—650 R                    9 Claims

ABSTRACT OF THE DISCLOSURE

The chlorination of alkyl-substituted aromatic compounds can be made selective to the nuclear chlorination of the compound rather than a side chain chlorination by effecting the chlorination reaction in the presence of a vanadium or molybdenum-containing compound.

This invention relates to a process for the chlorination of alkyl-substituted aromatic compounds. More specifically the invention is concerned with the chlorination of alkyl-substituted aromatic hydrocarbons in which said chlorination is made more selective by effecting the reaction in the presence of certain metal-containing compounds.

Alkyl-substituted aromatic compounds, and more particularly alkyl-substituted aromatic hydrocarbons which contain a chlorine substituent on the ring, may be utilized for various purposes in the chemical industry. For example the various isomers of chlorotoluene such as meta-chlorotoluene are used as a solvent and as an intermediate for various reactions while both o-chlorotoluene and p-chlorotoluene are used as solvents and intermediates for organic chemicals and dyes. It has now been discovered that an alkyl-substituted aromatic compound may be subjected to a chlorination reaction in the presence of certain metal-containing compounds of a type hereinafter set forth in greater detail whereby a selectivity in the chlorination of the compound will be achieved, there being obtained a greater amount of nuclearly-chlorinated products than is obtained when effecting the chlorination reaction in the absence of any of the particular metal-containing compounds.

It is therefore an object of this invention to provide a process for the chlorination of alkyl-substituted aromatic compounds.

A further object of this invention is to provide a process for the nuclear chlorination of alkyl-substituted aromatic hydrocarbons whereby the desired product is obtained in greater yields.

In one aspect an embodiment of this invention resides in a process for the nuclear chlorination of an alkyl-substituted aromatic hydrocarbon with a hypochlorite compound in the presence of a catalyst consisting of a vanadium or molybdenum-containing compound at chlorination conditions, and recovering the resultant nuclearly-chlorinated alkyl-substituted aromatic hydrocarbons.

A specific embodiment of this invention is found in a process for the nuclear chlorination of an alkyl-substituted aromatic hydrocarbon which comprises treating toluene with calcium hypochlorite in the presence of vanadyl acetylacetonate at a temperature in the range of from about ambient to about 150° C. and a pressure in the range of from atmospheric to about 100 atmospheres.

Other objects and embodiments will be found in the following further detailed description of the present invention.

As hereinbefore set forth the present invention is concerned with a process for improving the yield of nuclearly-chlorinated alkyl-substituted aromatic compounds. Under normal reaction conditions, hypochlorite compounds, when used as a chlorinating agent, normally react with alkyl-substituted aromatic compounds to form sidechain-chlorinated products with lesser amounts of ring-chlorinated products being formed during the reaction. The prior art has shown that when a nuclearly-chlorinated alkyl-substituted aromatic compound constituted the desired product, the use of a combination of reagents including a strong Friedel-Crafts type catalyst was necessary. In contradistinction to this, it has now been discovered that the distribution of reaction products may be altered so that nuclearly-chlorinated alkyl-substituted aromatic products may be obtained under mildly alkaline conditions in the presence of a hypochlorite compound and certain metal-containing compounds which may act as catalysts for the reaction. The obtention of the nuclearly-chlorinated alkyl-substituted aromatic compounds will be achieved at the expense of the sidechain-chlorinated products, the selectivity to the nuclearly chlorinated products being in a range of from about 1.5:1 to about 4:1 or more moles of nuclearly chlorinated product per mole of sidechain-chlorinated product. Examples of alkyl-substituted aromatic compounds, and particularly lower alkyl-substituted aromatic hydrocarbons which may be subjected to the nuclear chlorination process of the present invention will include the monoalkyl-substituted compounds such as toluene, ethylbenzene, n-propylbenzene, n-butylbenzene, n-amylbenzene, n-hexylbenzene, 1-methylnaphthalene, 2-methylnaphthalene, 1-ethylnaphthalene, 2 - ethylnaphthalene, 1-n-propylnaphthalene, 2-n-propylnaphthalene, the corresponding monoalkyl-substituted anthracenes, pyrenes, crysenes, etc. It is also contemplated within the scope of this invention that benzenes containing 3, 4, or 5 alkyl substituents may also undergo nuclear chlorination, examples of these compounds including hemimellitene, pseudocumene, mesitylene, prehnitene, isodurene, durene, pentamethylbenzene, although not necessarily with equivalent results.

Examples of hypochlorite compounds which may be used will include the hypochlorites of the alkali metals and alkaline earth metals such as sodium hypochlorite, potassium hypochlorite, lithium hypochlorite, calcium hypochorite, magnesium hypochlorite, barium hypochlorite, etc. In addition, it is also contemplated within the scope of this invention, that other hypochlorite compounds may be used including the tertiary-alkyl hypochlorites such as t-buty hypochlorite, t-amyl hypochlorite, etc., although not necessarily with equivalent results.

As hereinbefore set forth by utilizing a metal-containing compound of the type hereinafter set forth in greater details in the chlorination of the alkyl-substituted aromatic compounds with a chlorinating agent, it is possible to obtain nuclearly-chlorinated products rather than sidechain-chlorinated products. Examples of the metal-containing compounds which may be employed comprise hydrocarbon soluble molybdenum- or vanadium-containing compounds. Some representative examples of these molybdenum- or vanadium-containing compounds will include the carbonyl compounds of zero valence molybdenum such as molybdenum hexacarbonyl, tris(acetonitrile) molybdenum tricarbonyl, benzene molybdenum tricarbonyl, toluene molybdenum tricarbonyl, o-xylene molybdenum tricarbonyl, m-xylene molybdenum tricarbonyl, p-xylene molybdenum tricarbonyl, hemimellitene molybdenum tricarbonyl, p-xylene molybenum tricarbonyl, hemimellitene molybdenum tricarbonyl, pseudocumene molybdenum tricarbonyl, mesitylene molybdenum tricarbonyl, prehnitol molybdenum tricarbonyl, isodurene molybdenum tricarbonyl, durene molybdenum tricarbonyl, etc., the stable acid salts as molybdenum oxalate, molybdenyl acetylacetonate, molybdenum acetate, molybdenum propionate, molybdenum valerate, molybdenum caproate, molybdenum laurate, molybdenum palmate, molybdenum stearate, etc., vanadium carbonyl, benzene vanadium tricarbonyl, toluene vanadium tricarbonyl, o-xylene vanadium trcicarbonyl, m-xylene vanadium tricarbonyl, p-xylene vanadium tricarbonyl, vanadium tetroxide, vanadium pentoxide, vanadium oxalate, vanadyl acetylacetonate, etc.

The reaction conditions under which the chlorination of the alkyl-substituted aromatic compound is effected will include relative low operating temperatures which may range from ambient (about 20° to about 25° C.) up to about 150° C. and a pressure in the range of from about atmospheric up to about 100 atmospheres. Superatmospheric pressures are provided for by the introduction of an inert gas such as nitrogen into the reaction zone, the amount of pressure being employed during the reaction being that which is necessary to maintain a major portion of the reactants in the liquid phase.

The reaction of the present invention may be effected in any suitable manner and may comprise either a batch or continuous type operation. For example, when a batch type operation is used, a quantity of the alkyl-substituted aromatic hydrocarbon is placed in an appropriate apparatus which may comprise a flask, if atmospheric pressure is to be employed; or an autoclave of the rotating or mixing type, if superatmospheric pressures are to be employed. The hydrocarbon-soluble catalyst comprising a molybdenum-containing or a vanadium-containing compound is then added into the hydrocarbon and dissolved therein. Following this the alkyl-substituted aromatic hydrocarbon has added thereto the hypochlorite compound, following which the reaction mixture is heated to the desired operating temperature and maintained thereat for a period of time which may range from about 0.5 up to about 60 hours or more in duration. At the end of the predetermined residence time, heating is discontinued and the apparatus and contents thereof are allowed to cool to room temperature. If superatmospheric pressures within the range hereinbefore set forth have been employed, the excess pressure is discharged and the reaction mixture is recovered therefrom. The mixture is then separated from the solid hypochlorite which may be present and subjected to conventional means of purification, such means including washing, drying, extraction, fractional distillation, etc., whereby the desired nuclearly-chlorinated alkyl-substituted aromatic hydrocarbon is separated from any unreacted starting material and/or side products which may have formed during the reaction and recovery.

It is also contemplated within the scope of this invention that the reaction may be effected in a continuous manner of operation. When such a type of operation is used, the alkyl-substituted aromatic hydrocarbon which is to undergo nuclear chlorination has dissolved therein the vanadium-containing or molybdenum-containing compound and the resulting mixture is continuously charged to a reaction zone which is maintained at the proper operating conditions of temperature and pressure. If so desired, the hypochlorite compound is also continuously charged to the reactor through separate means. Alternatively speaking, the hypochlorite compound may be disposed in the reaction zone and the alkyl-substituted aromatic compound containing -the dissolved molybdenum-containing or vanadium-containing compound may be passed over a bed of the hypochlorite compound in either an upward or downward flow. After completion of the desired residence time in the reactor, the effluent is continuously withdrawn and subjected to the conventional means of separation hereinbefore set forth in greater detail whereby the desired nuclearly chlorinated alkyl-substituted aromatic compound is separated from any unreacted starting material and recovered for storage, the aforesaid unreacted starting materials which may still contain the vanadium or molybdenum compound dissolved therein being recycled to the reaction zone to form a portion of the feed stock.

Inert solvents such as water, chlorobenzene, etc. may be utilized to facilitate the handling and contacting of the various reagents, but not necessarily with equivalent results.

The following examples are given to illustrate the process of the present invention which, however, are not intended to limit the generally broad scope of the present invention in strict accordance therewith.

EXAMPLE I

In this example 46 g. (0.5 mole) of toluene and 0.5 g. (0.002 mole) of molybdenum hexacarbonyl were admixed, the molybdenum hexacarbonyl dissolving in the toluene. This mixture was placed in the glass liner of a rotating autoclave along with 17.9 g. (0.125 mole) of calcium hypochlorite. The glass liner was sealed into the autoclave which was then heated to a temperature of 100° C. and maintained thereat for a period of 16 hours. At the end of this time, heating was discontinued, the autoclave was allowed to return to room temperature and opened. The reaction mixture was recovered from the autoclave, the calcium hypochlorite which remained unreacted and other calcium salts were separated and the liquid product subjected to a gas-liquid chromatographic analysis. This analysis disclosed that chlorotoluene comprising a mixture of the ortho- and para-isomers was present in a yield of 5.9% while benzyl chloride was present in a yield of 3.8%, the ratio of chlorotoluenes to benzyl chloride being 1.6:1.

EXAMPLE II

In like manner 0.5 g. (0.002 mole) of vanadyl acetylacetonate was dissolved in 46 g. (0.5 mole) of toluene. The toluene solution was placed in the glass liner of a rotating autoclave along with 17.9 g. (0.125 mole) of calcium hypochlorite. The liner was sealed into the rotating autoclave which was then heated to a temperature of 100° C. and maintained thereat for a period of 16 hours. At the end of the 16-hour period, heating was discontinued, the autoclave was allowed to return to room temperature and opened. The reaction mixture was recovered and the liquid product was separated from the unreacted solid calcium hypochlorite and other calcium salts. Analysis of the liquid product by means of a gas-liquid chromatographic technique disclosed the presence of chlorotoluene comprising a mixture of ortho- and para-isomers in a yield of 10.5% and a yield of 3.5% of benzyl chloride. It is to be noted that the ratio of chlorotoluenes to benzyl chloride was 3.0:1.

EXAMPLE III

To illustrate the necessity for the presence of a molybdenum-containing or vanadium-containing compound, another experiment was performed in which 46 g. (0.5 mole) of toluene and 17.9 g. (0.125 mole) of calcium hypochlorite was placed in the glass liner of a rotating autoclave, the liner was sealed into the autoclave which was then heated to a temperature of 100° C. and maintained thereat for a period of 16 hours. At the end of this time, heating was discontinued, the autoclave allowed to return to room temperature and the reaction mixture was recovered therefrom. The liquid reaction product was separated from the unreacted calcium hypochlorite and analyzed by means of gas-liquid chromatographic technique. This analysis disclosed a yield of 8.0% chlorotoluenes and an 8.9% yield of benzyl chloride. This yield meant that there was a ratio of chlorotoluenes to benzyl chloride of 0.9:1, thus clearly indicating the unexpected result which was obtained when effecting the reaction in the presence of a molybdenum-containing or vanadium-containing compound when it is desired to selectively chlorinate an alkyl-substituted aromatic compound to form a nuclearly-chlorinated product.

EXAMPLE IV

In this example 53 g. (0.5 mole) of ethylbenzene and 0.5 g. (0.002 mole) of molybdenyl acetylacetonate are admixed and the resulting solution is placed in the glass liner of a rotating autoclave. To this solution is added 14.8 g. (0.025 mole) of sodium hypochloridte in water and the resulting mixture is sealed into the rotating autoclave. The autoclave is heated to a temperature of 100° C. and maintained thereat for a period of 16 hours. At the end of this time heating is discontinued and the autoclave after being allowed to return to room temperature is opened. The reaction mixture is recovered and the organic product separated from the aqueous solution. Analysis of this organic product by means of preparative gas-liquid chromatographic techniques will disclose the presence of a mixture of o-chloroethylbenzene, and p-chloroethylbenzene along with alpha-chloroethylbenzene, the mixture of ortho-chloroethylbenzene and para-chloroethylbenzene being present in a ratio of about 2.0:1 to the alpha-chloroethylbenzene.

A repeat of this experiment in which the molybdenum acetylacetonate is absent will result in obtaining a mixture of ortho- and para-chloroethylbenzene in an approximately equal ratio.

EXAMPLE V

In like manner 0.5 g. (0.002 mole) of vanadyl acetylacetonate is added to 60 g. (0.5 mole) of n-propylbenzene. The resulting solution is placed in the glass liner of a rotating autoclave along with 17.9 g. of calcium hypochlorite. The liner is sealed into the autoclave and thereafter the autoclave is heated to a temperature of of 100° C. After maintaining the autoclave at this temperature for a period of 16 hours, heating is discontinued and the autoclave is allowed to return to room temperature. The reaction mixture is recovered, the liquid product separated from the solid and subjected to a preparative gas-liquid chromatographic analysis. This analysis will disclose that the product comprises a mixture of o-chloro-n-propylbenzene, p-chloro-n-propylbenzene and alpha-chloro-n-propylbenzene, the mixture of o-chloro-n-propylbenzene and p-chloro-n-propylbenzene being present in a ratio of about 2.0:1 over that of the alpha-chloro-n-propylbenzene.

When the above experiment is repeated by admixing like amounts of n-propylbenzene and calcium hypochlorite in the absence of any vanadyl acetylacetonate the product distribution will be found to be approximately a 1:1 ratio of o-chloro-n-propylbenzene and p-chloro-n-propylbenzene to alpha-chloro-n-propylbenzene.

I claim as my invention:

1. A process for the nuclear chlorination of lower alkyl-substituted benzene which comprises treating said lower alkyl-substituted benzene with an alkali metal or alkaline earth metal hypochlorite in the presence of a catalyst consisting of a vanadium or molybdenum-containing compound soluble in said lower alkyl-substituted benzene and selected from the group consisting of vanadium carbonyl, molybdenum carbonyl, vanadium tetroxide, vanadium pentoxide, and stable acid salts of vanadium and molybdenum selected from the group consisting of molybdenum oxalate, molybdenyl acetylacetonate, molybdenum acetate, molybdenum propionate, molybdenum valerate, molybdenum caproate, molybdenum laurate, molybdenum palmate, molybdenum stearate, vanadium oxalate and vanadyl acetylacetonate, at a temperature in the range of from about ambient to about 150° C. and a pressure in the range of from about atmospheric to about 100 atmospheres such that said pressure maintains at least a major portion of the reactants in the liquid phase, and recovering the resultant nuclearly-chlorinated alkyl-substituted benzene.

2. The process as set forth in claim 1 in which said catalyst is molybdenum hexacarbonyl.

3. The process as set forth in claim 1 in which said catalyst is vanadyl acetylacetonate.

4. The process as set forth in claim 1 in which said catalyst is molybdenyl acetylacetonate.

5. The process as set forth in claim 1 in which said hypochlorite compound is calcium hypochlorite.

6. The process as set forth in claim 1 which said hypochlorite compound is sodium hypochlorite.

7. The process as set forth in claim 1 in which said lower alkyl-substituted benzene is toluene and said nuclearly-chlorinated lower alkyl-substituted benzene is a mixture of o-chlorotoluene and p-chlorotoluene.

8. The process as set forth in claim 1 in which said lower alkyl-substituted benzene is ethylbenzene and said nuclearly-chlorinated lower alkyl-substituted benzene is a mixture of o-chloroethylbenzene and p-chloroethylbenzene.

9. The process as set forth in claim 1 in which said lower alkyl-substituted benzene is n-propylbenzene and said nuclearly-chlorinated lower alkyl-substituted benzene is a mixture of o-chloro-n-propylbenzene and p-chloro-n-propylbenzene.

References Cited

Martin et al., Ber. *99*, p. 1266–1271, 1966.
Harvey et al., J. Chem. Soc., 1961, 3604–10.
Hopkins et al., Chem. Abst. *41*, 734d.
Zavitsas, J. Org. Chem., 29, 3086–3087, 1964.

HOWARD T. MARS, Primary Examiner

U.S. Cl. X.R.

210—649 R